Sept. 19, 1939.　　　O. T. HANDWERK　　　2,173,436
MEASURING INSTRUMENT
Filed April 5, 1937　　　2 Sheets-Sheet 1
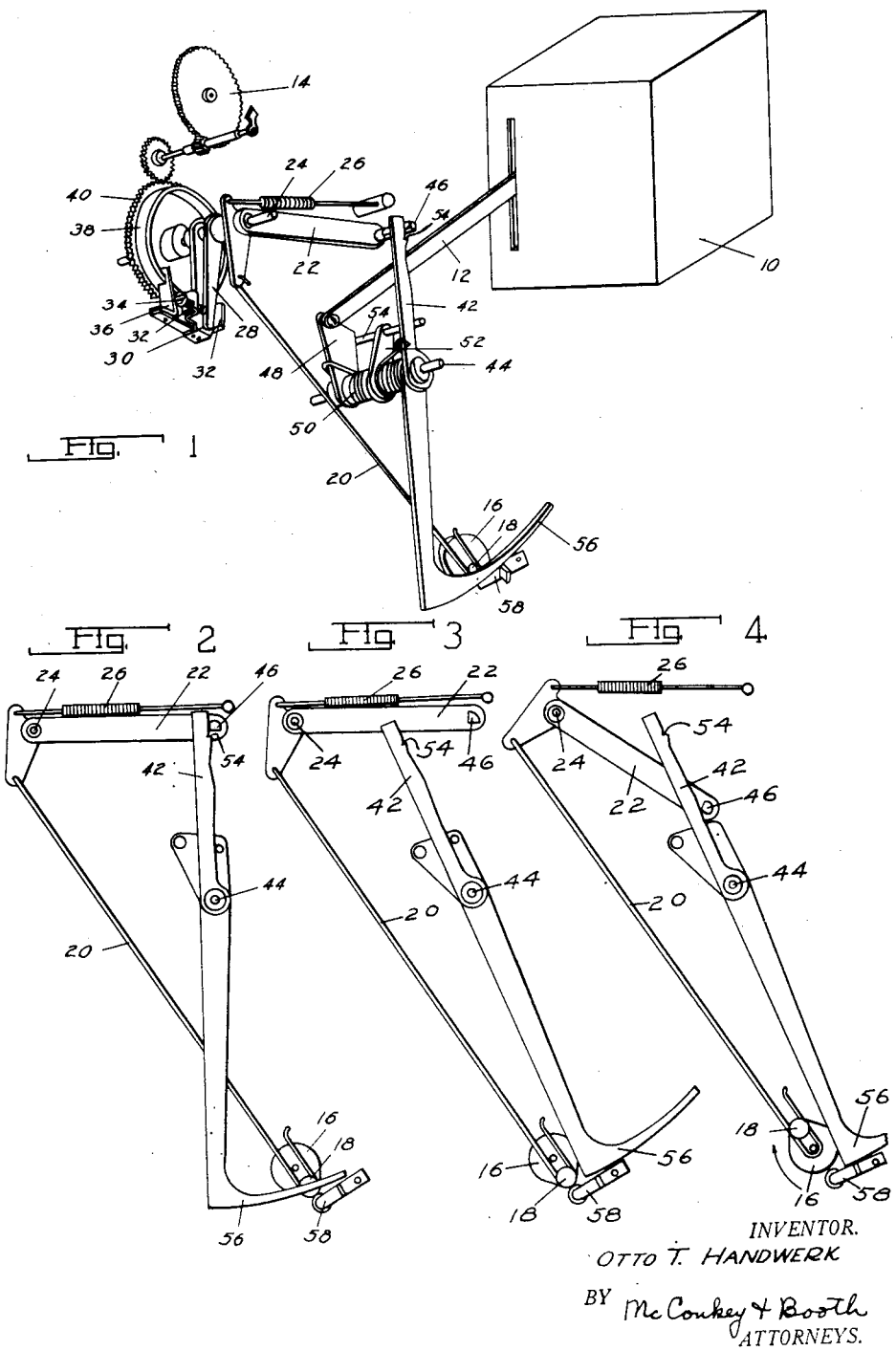
INVENTOR.
OTTO T. HANDWERK
BY McConkey & Booth
ATTORNEYS.

Sept. 19, 1939.  O. T. HANDWERK  2,173,436
MEASURING INSTRUMENT
Filed April 5, 1937   2 Sheets-Sheet 2
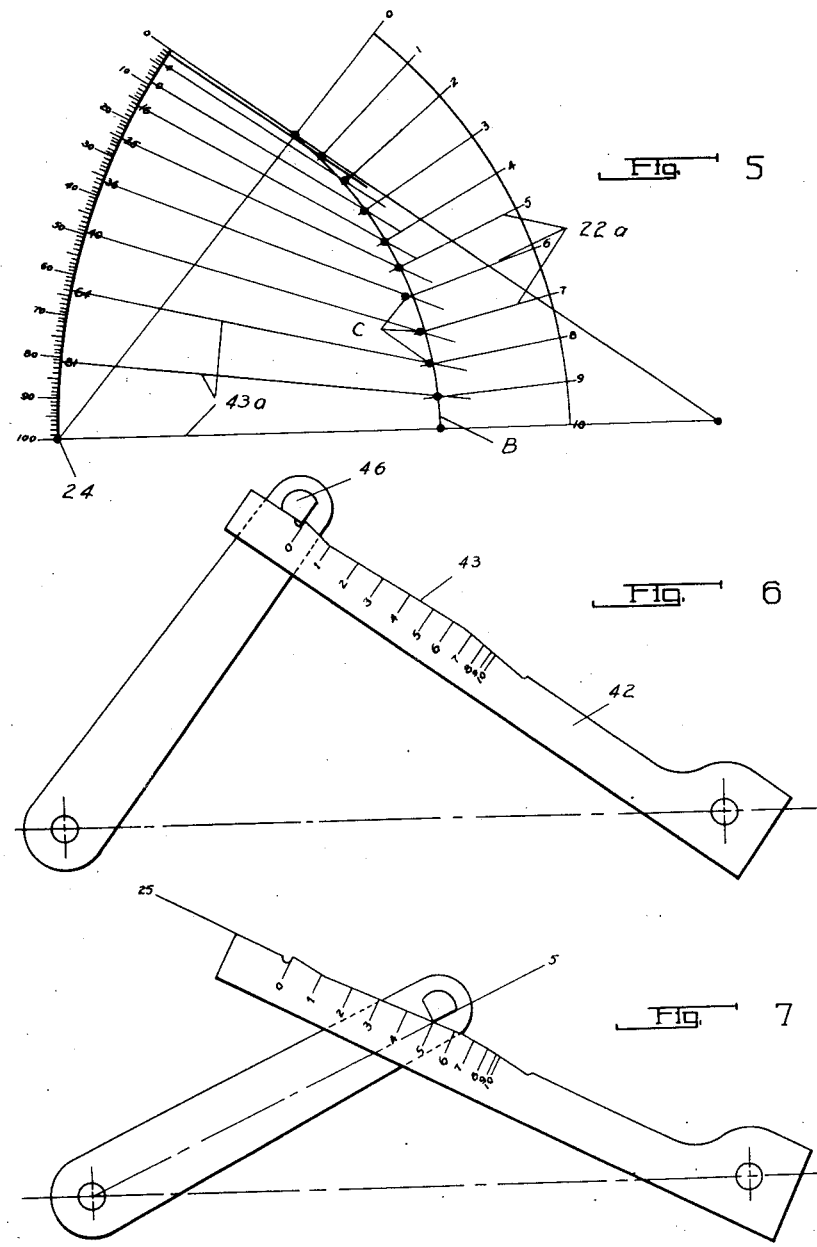
INVENTOR.
OTTO T. HANDWERK
BY McConkey & Booth
ATTORNEYS.

Patented Sept. 19, 1939

2,173,436

UNITED STATES PATENT OFFICE 2,173,436

MEASURING INSTRUMENT

Otto T. Handwerk, Chicago, Ill., assignor to Republic Flow Meters Company, Chicago, Ill., a corporation of Illinois Application April 5, 1937, Serial No. 135,041

1 Claim. (Cl. 235—61)

This invention relates to measuring instruments and more particularly to totaling mechanism and the means for operating such mechanism in an instrument of this type.

One of the objects of the invention is to provide a measuring instrument in which varying quantities measured are integrated against time. For example, flow of a fluid might be so integrated to indicate the total quantity of fluid flow during any given interval of time.

Another object of the invention is to provide a measuring instrument in which varying values of the condition measured are transmitted directly and accurately to the totaling mechanism. The instrument may include a novel cam lever formed according to a desired function of the measured value, for example, the square root, and operated by mechanism responsive to the condition to be measured. The cam lever may serve to limit the amount of oscillation of an arm which drives a rotatable totaling mechanism through a suitable one-way drive connection.

According to one feature of the invention the cam lever includes a shoulder adjacent its zero end against which the arm strikes when the lever is at zero or within a predetermined amount thereof. This insures that there will be no operation of the totaling mechanism when the quantity being measured is substantially zero.

Another feature of the invention relates to a novel yielding drive for the cam lever which will yield to permit movement of the sensitive mechanism even though the cam lever is not free to move.

Other objects, advantages and novel features of the invention will be apparent from the following description when read in connection with the accompanying drawings, in which:

Figure 1 is a diagrammatic perspective view of an instrument embodying the invention;

Figures 2, 3 and 4 are views showing different positions of a portion of the linkage of Figure 1;

Figure 5 is a diagram illustrating the designing of a cam lever; and

Figures 6 and 7 are enlarged views showing two interengaging parts of the mechanism in different positions.

The instrument shown in Figure 1 includes a mechanism indicated generally at 10 which is responsive to changes in a condition to be measured. This mechanism may, for example, be that shown in my copending application Serial No. 5779 filed February 9, 1935, of which this application is a division, that mechanism being responsive to variations in fluid flow and giving to a link 12 movements proportional to the square of the flow.

A totaling mechanism is preferably provided to show the total amount of fluid flow over a period of time and as shown such mechanism is constituted by a suitable cyclometer or other counter mechanism 14. Power means, not shown, is provided for periodically operating the totaling mechanism through a crank 16 having a crank pin 18 for operation in a slot in the end of a link 20. As the crank rotates, pin 18 engages the end of the slot in link 20 to pull the same downwardly into the position of Figures 1, 2, and 3 and on further rotation the pin moves up to the position of Figure 4 in which link 20 is released and permitted to move upwardly. Link 20 is connected at its upper end to one arm of a bell crank lever 22 which is pivoted on a fixed shaft 24. A spring 26 is connected to the bell crank lever urging it constantly in a clockwise direction.

A lever 28 is pivoted on shaft 24 and is connected to bell crank lever 22 for rotation therewith. A second lever 30 is also pivoted on shaft 24 and is provided with flanges 32 between which the end of lever 28 is located, thus forming a lost-motion connection between the two levers. Preferably a screw 34 is screwed through one of the flanges so that the amount of lost motion between the levers and the point at which they become drivably connected can be adjusted.

Lever 30 carries a suitable one-day drive connection 36 shown as of the type disclosed and claimed in the copending application of George W. Grisdale, Serial No. 2,649, filed January 21, 1935, now matured into Patent No. 2,074,585, granted March 23, 1937. This connection 36 is constituted by a notched lever mounted on a leaf spring which is secured to lever 30 and so arranged that the notch will bind on a flange 38 on a gear wheel 40 when the lever 30 moves in one direction but not when it moves in the other. Thus gear wheel 40 will be driven in one direction and drives the counter 14 through suitable gearing indicated in part in Figure 1.

The above mechanism causes bell crank lever 22 to oscillate periodically about its pivot as illustrated in Figures 2, 3 and 4, to drive levers 28 and 30 and the counter. The degree of oscillation of the bell crank is controlled by a novel square-root cam lever 42 mounted for pivotal movement about a shaft 44 and having on one edge a square-root cam surface to be engaged by a pin 46 carried by lever 22. The position of the cam lever is controlled according to the value of the condition being measured by mechanism 10 through connecting link 12. The link 12 is pivoted to a lever 48 pivoted on shaft 44 and yieldingly connected by a coil spring 50 with a lever 52 having an elongated pin 54 engaging both lever 48 and the cam lever 42. Spring 50 is extended to engage the cam lever so that both the cam lever 42 and lever 48 are yieldingly connected to lever 52 and are yieldingly connected together.

The cam lever is preferably provided with a shoulder stop 54 adjacent its end corresponding to zero so that when the cam lever is in its zero position pin 46 will engage shoulder 54 and will be prevented from turning. The cam lever also has an extension carrying an arcuate sector 56 which is adapted to be engaged by a brake 58 to hold the cam lever stationary. The brake is urged into engagement with the sector 56 by any suitable spring (not shown) and is forced out of engagement by operation of the crank 16 which is cam-shaped and engages a suitable cam roller carried by the brake.

As shown in Figures 5-7, the lever 42 has a novel cam surface 43 engaged by the pin 46 in such a manner that angular movements of arm 22 are proportional to the square roots of the movements of lever 42, and are therefore proportional to the square root of the differential pressures measured by mechanism 10, and therefore are directly proportional to the flow being measured.

Figure 5 illustrates one method of laying out the contour of the cam surface 43. In this figure, lines 43a represent different angular positions of arm 42 proportional to various uniform changes in flows, from 1 to 10 (or any arbitrary scale), and therefore represent angular positions on a uniformly-graduated scale (shown for purposes of illustration as graduated from zero to 100) equal to the squares of those flows, or equal to the differential pressures created by the flows. Lines 22a represent ten equally angularly spaced positions of the arm 22.

The dots "C" represent the intersections of lines 22a with lines 43a, and therefore represent the positions at which pin 46 should engage the edge of lever 42 to give equal spacings of arm 22 for equal changes in flow (i. e. for equal changes in the square roots of the differential pressures). "B" is a circular arc struck about the axis of shaft 24, and therefore represents what would be a straight-edge on the cam surface 43.

The surface 43 is readily plotted from the positions of intersections "C". By comparing the positions of these intersections in Figure 5 with the curve "B", it will be seen that the surface 43, while not a straight line, is much more nearly so than in square-root cams previously used in meters and other instruments of this type. This facilitates accurate manufacture at low cost, as the cam may be formed by a simple blanking or shearing operation.

As mechanism 10 moves link 12, it rocks lever 48 and, through the yielding connection 50—54, the cam lever 42. The cam lever is held by brake 58 except when the crank cam 16 is in the position of Figures 1, 2 and 3, spring 50 yielding to permit movement of lever 48 in either direction when the cam lever is locked. As crank 16 rotates brake 58 is periodically locked and released and link 20 pulled down and released to raise bell crank lever 22 and release it for swinging movement under the influence of spring 26. Figure 2 shows the zero position of the cam lever with lever 22 raised by the crank, and with brake 58 released, and Figure 3 shows a similar position with the cam lever swung around to a position corresponding substantially to maximum flow. Figure 4 shows the position of the parts after crank 16 has turned through substantially 180° from the position shown in Figure 3 with brake 58 engaging sector 56, crank pin 18 loose in the slot in link 20 and bell crank 22 swung around under the influence of spring 26 until pin 46 is in contact with the cam lever. Thus the force of pin 46 striking the cam lever is taken by the brake rather than the operating linkage and the linkage is free to move through yielding of spring 50. It will be noted from Figures 1, 2 and 3 that the pin 46 is raised above the zero shoulder on the cam lever, the distance between the pin and shoulder constituting lost motion to insure that the brake is engaged before the pin strikes the cam lever.

From the above it will be apparent that the amount of movement of lever 22 is dependent on the position of the cam lever 42 which is so formed and controlled as to limit the movement of lever 22 to be proportional to the flow through the conduit, i. e. to the square root of the differential of the pressures. As lever 22 and lever 28 which is connected thereto are oscillated, lever 30 will also be oscillated. The lost motion between levers 28 and 30 corresponds to the lost motion between shoulder 54 and the upper position of pin 46 so that lever 30 will be moved only after pin 46 has passed its zero position at shoulder 54.

As lever 30 oscillates in a clockwise direction the notched lever slides over flange 38 but as it oscillates in a counterclockwise direction the notch grips the flange and rotates gear 40. This gear operates the counter which is so graduated as to indicate the total flow in pounds, cubic feet or other desired units. The gearing is so proportioned that each movement of lever 22 turns up on the counter an amount equal to the flow for which cam lever 42 is set times the length of time required for crank 16 to make one revolution, say fifteen seconds. Thus the counter gives an accurate indication of the total flow through the conduit over a period of time.

While one embodiment of the invention has been illustrated and described in detail it will be understood that various changes might be made therein and it is not intended that the scope of the invention shall be limited to the exact form shown or otherwise than by the terms of the appended claim.

What is claimed is:

In a measuring instrument having an oscillating arm carrying a pin, a cam arm pivotally mounted on an axis parallel to the axis of said oscillating arm and formed with a cam surface to be engaged by said pin having a shoulder thereon adjacent the portion thereof corresponding to the zero position of the instrument, said shoulder engaging the pin to prevent movement thereof except when the cam arm is moved a predetermined amount past its zero position.

OTTO T. HANDWERK.